(12) United States Patent
Zoeteman

(10) Patent No.: US 8,714,511 B2
(45) Date of Patent: May 6, 2014

(54) UMBRELLA STAND

(76) Inventor: Raymond Zoeteman, Munster, IN (US)

( * ) Notice: Subject to any disclaimer, the term of this patent is extended or adjusted under 35 U.S.C. 154(b) by 59 days.

(21) Appl. No.: 13/327,169

(22) Filed: Dec. 15, 2011

(65) Prior Publication Data

US 2013/0153737 A1    Jun. 20, 2013

(51) Int. Cl.
    *A01K 97/10*    (2006.01)
(52) U.S. Cl.
    USPC ............... 248/537; 248/206.5; 248/309.1; 135/16
(58) Field of Classification Search
    USPC .............. 248/513, 514, 206.5, 309.4, 314; 40/600; 16/111.1; 135/16, 25.4, 98; 224/200, 922; 43/21.2
    See application file for complete search history.

(56) References Cited

U.S. PATENT DOCUMENTS

| | | | |
|---|---|---|---|
| 1,523,042 A | | 1/1925 | Thomas |
| 2,055,842 A | | 9/1936 | Haislip |
| 2,576,624 A | | 11/1951 | Miller |
| 3,009,225 A | * | 11/1961 | Budreck ................... 24/303 |
| 3,191,898 A | | 6/1965 | McCullough |
| 3,407,825 A | | 10/1968 | Doyle |
| 3,759,278 A | | 9/1973 | Hoffmann |
| 3,765,434 A | | 10/1973 | Riggs |
| 3,802,112 A | | 4/1974 | Banner |
| 4,188,965 A | | 2/1980 | Morman |
| 4,303,054 A | | 12/1981 | Lore |
| 4,570,894 A | | 2/1986 | Miele |
| 4,585,201 A | * | 4/1986 | Pursell ..................... 248/523 |
| 4,624,276 A | | 11/1986 | Allen |
| 4,632,137 A | | 12/1986 | Exley et al. |
| 4,696,447 A | | 9/1987 | Strecker |
| 4,856,546 A | | 8/1989 | Kummunsalo |
| 4,948,083 A | * | 8/1990 | McNaney et al. ............ 248/514 |
| 5,029,799 A | | 7/1991 | Bernier |
| 5,150,728 A | | 9/1992 | Stark |
| 5,163,652 A | | 11/1992 | King |
| 5,318,055 A | | 6/1994 | Olaniyan |
| 5,385,161 A | | 1/1995 | Loker et al. |
| 5,404,682 A | * | 4/1995 | West .............................. 52/165 |
| 5,727,583 A | | 3/1998 | Kennedy |
| 5,813,163 A | * | 9/1998 | Dysarz ........................ 43/21.2 |
| 6,082,157 A | * | 7/2000 | Boyce ............................. 70/58 |
| 6,477,749 B1 | * | 11/2002 | Reiter .......................... 24/303 |
| 6,564,434 B1 | * | 5/2003 | Morita .......................... 24/303 |
| 6,637,146 B2 | * | 10/2003 | Ernst ............................ 43/21.2 |
| 6,739,567 B1 | * | 5/2004 | Curtis .......................... 248/548 |
| 6,895,642 B2 | * | 5/2005 | Huang ........................... 24/303 |
| 6,908,138 B2 | * | 6/2005 | Yang ........................... 296/95.1 |
| 6,941,694 B2 | * | 9/2005 | Ernst ............................ 43/21.2 |
| 7,188,821 B2 | * | 3/2007 | Curtis .......................... 248/683 |
| 7,377,474 B2 | * | 5/2008 | Curtis ......................... 248/206.5 |
| 7,387,284 B2 | * | 6/2008 | Chang ........................ 248/206.5 |

(Continued)

OTHER PUBLICATIONS

Patio Umbrella Stands: Compare Prices and Read Reviews—Bing Shopping website (http://www.bing.com/shopping/search?q=patio+umbrella+stands&qpvt+patio+umbrella=sta...), printed Jan. 9, 2012. (2 pages).

*Primary Examiner* — Terrell McKinnon
*Assistant Examiner* — Daniel J Breslin
(74) *Attorney, Agent, or Firm* — K&L Gates LLP

(57) ABSTRACT

The present disclosure provides a compact portable lightweight strong umbrella stand that can be quickly and easily attached to different metal objects and that is configured to securely hold a relatively heavy umbrella such as a patio umbrella.

3 Claims, 5 Drawing Sheets

(56) References Cited

U.S. PATENT DOCUMENTS

| | | | |
|---|---|---|---|
| 7,448,590 B1 * | 11/2008 | Holton | 248/534 |
| 7,669,361 B2 * | 3/2010 | Baez | 43/27.4 |
| 7,757,989 B1 * | 7/2010 | Huffman et al. | 242/306 |
| 8,123,190 B2 * | 2/2012 | Kost | 248/514 |
| 8,146,879 B2 * | 4/2012 | Liao | 248/514 |
| 8,430,052 B2 * | 4/2013 | Nihra et al. | 116/173 |
| 2002/0083603 A1 * | 7/2002 | Jang | 33/281 |
| 2003/0217500 A1 * | 11/2003 | Ernst | 43/21.2 |
| 2005/0218285 A1 * | 10/2005 | Yorns et al. | 248/314 |
| 2007/0108364 A1 * | 5/2007 | Metheny | 248/541 |
| 2010/0244419 A1 * | 9/2010 | Maripudi | 280/743.2 |

* cited by examiner

UMBRELLA STAND

BACKGROUND

People in many different occupations often work outdoors. Working outdoors can be hazardous at various times during the year. For example, in the summertime or in warm weather climates, the daytime temperatures are often relatively high such as temperatures ranging from 80 to 110 degrees. It is widely known that working in these relatively high temperatures as well as in direct sunlight for extended periods of time can be hazardous for such workers. For example, working in these temperatures can cause people to experience fatigue, heat stroke, and other heat related aliments. It is widely known that regular and prolonged exposure to direct sunlight can cause numerous ailments ranging from sunburn to skin cancer.

Outdoor workers thus often try to work in shaded areas when possible. Areas shaded from direct sunlight are or typically feel between 5 and 20 degrees cooler than un-shaded areas in direct sunlight. Shade also blocks these workers from having to work in direct sunlight and helps to avoid sunburn and other aliments.

Outdoor workers often try to work under shading devices such as overhangs, tents, and umbrellas so that they can work in shaded areas. For instance, lifeguards often sit under umbrellas or overhangs. While some outdoor workers are able work in shaded areas, many outdoor workers are unable to work in shaded areas on a regular basis.

These problems are multiplied for outdoor workers that need to work on roofs. For instance, air conditioning units are often situated on roofs of buildings. Air conditioning unit installers, mechanics, and other service technicians often have to work on roofs of buildings to install and service such equipment. On sunny days in the summertime or in warm weather climates, the temperatures on roofs are often 10 to 20 degrees higher than the temperatures on the ground. These workers often need to spend many hours on roofs installing or servicing such air conditioning units. In addition to these higher temperatures on roofs, roofs typically have less or little to no shaded areas, and thus people working on roofs are often fully exposed to such greater heat and direct sunlight for extended periods of time.

Additional problems with working on roofs are that: (a) roofs often have few, if any, places to secure shading devices; (b) workers on roofs typically try to minimize the amount of equipment and supplies that they need to haul up or bring up to the roofs on ladders or otherwise; and (c) winds on roofs tend to be greater than on the ground. Due to these additional problems, workers tend to not work in shaded areas on roofs.

As mentioned above, one well known way to provide shade for people is by using an umbrella. Various different types of umbrellas are well known.

One well known type of umbrella is a rain umbrella. While rain umbrellas are typically lightweight, they typically: (a) are not very strong (especially to hold up to relatively strong winds or the wear and tear of being in a harsh work environment); (b) do not provide a substantial amount of shade; and (c) are not easily securable to objects. Accordingly, outdoor workers (such as people who work on roofs) do not typically employ rain umbrellas to provide shade in their work environments.

Another well known type of umbrella is a beach umbrella. Beach umbrellas typically include a pole which is configured to be inserted in the sand. These types of umbrellas are not well suited for roofs and various other outdoor work environments. While beach umbrellas are typically stronger than rain umbrellas, outdoor workers (such as people who work on roofs) also do not typically employ beach umbrellas to provide shade in their work environments.

Another well known type of umbrella is a patio umbrella. Patio umbrellas typically have a relatively thick supporting pole and a wide top. Patio umbrellas typically need to be supported by a relatively heavy stand having a relatively wide base and a relatively long pole holder to prevent them from falling over. For example, one typical stand for a patio umbrella weighs approximately 15 to 20 pounds (6.80 to 9.07 kilograms), has a substantially square base with a width that is approximately 18.00 to 20.00 inches (45.70 to 50.80 centimeters), and a pole holder that extends approximately 12.00 to 16.00 inches (30.50 to 40.60 centimeters) upwardly from the base. Such umbrella stands need to have such a wide base, long pole holder, and be of such a relatively heavy weight to safely hold such heavier patio umbrellas. Outdoor workers (such as people who work on roofs) typically do not use such umbrellas and stands to provide shade in their work environments for a variety of reasons.

One reason is that the combination of such umbrellas and stands are heavy and bulky, and workers do not want to carry these umbrellas and umbrella stands to their respective job sites (such as to roofs). Another reason is that many outdoor workers such as air conditioning repair technicians often work on multiple different units at multiple different locations each day. Each time the technician goes to a job site or location, they need to unload from their truck all of the tools and necessary equipment to service or fix the unit, and then repack their tools and equipment in their trucks after they are finished. Outdoor workers typically do not want to add the time and effort to their typical day by moving and setting up such heavy and bulky umbrella stands and umbrellas as well as their tools and equipment, especially when they work at multiple different locations during their typical day.

Accordingly, there is a need for a compact portable lightweight strong apparatus for providing shade for people such as outdoor workers such as outdoor workers on roofs.

SUMMARY

The present disclosure solves the above problems for people such as various outdoor workers by providing a compact portable lightweight strong umbrella stand that can be quickly and easily attached to different metal objects and that is configured to securely hold a relatively heavy umbrella (such as a patio type umbrella) to provide a shaded area for a person such as an outdoor worker. The compact portable lightweight strong umbrella stand umbrella stand of the present disclosure is sometimes referred to herein as the "umbrella stand" or the "stand" for brevity.

Additional features and advantages are described herein, and will be apparent from the following Detailed Description and the figures.

DETAILED DESCRIPTION

Figure 1:
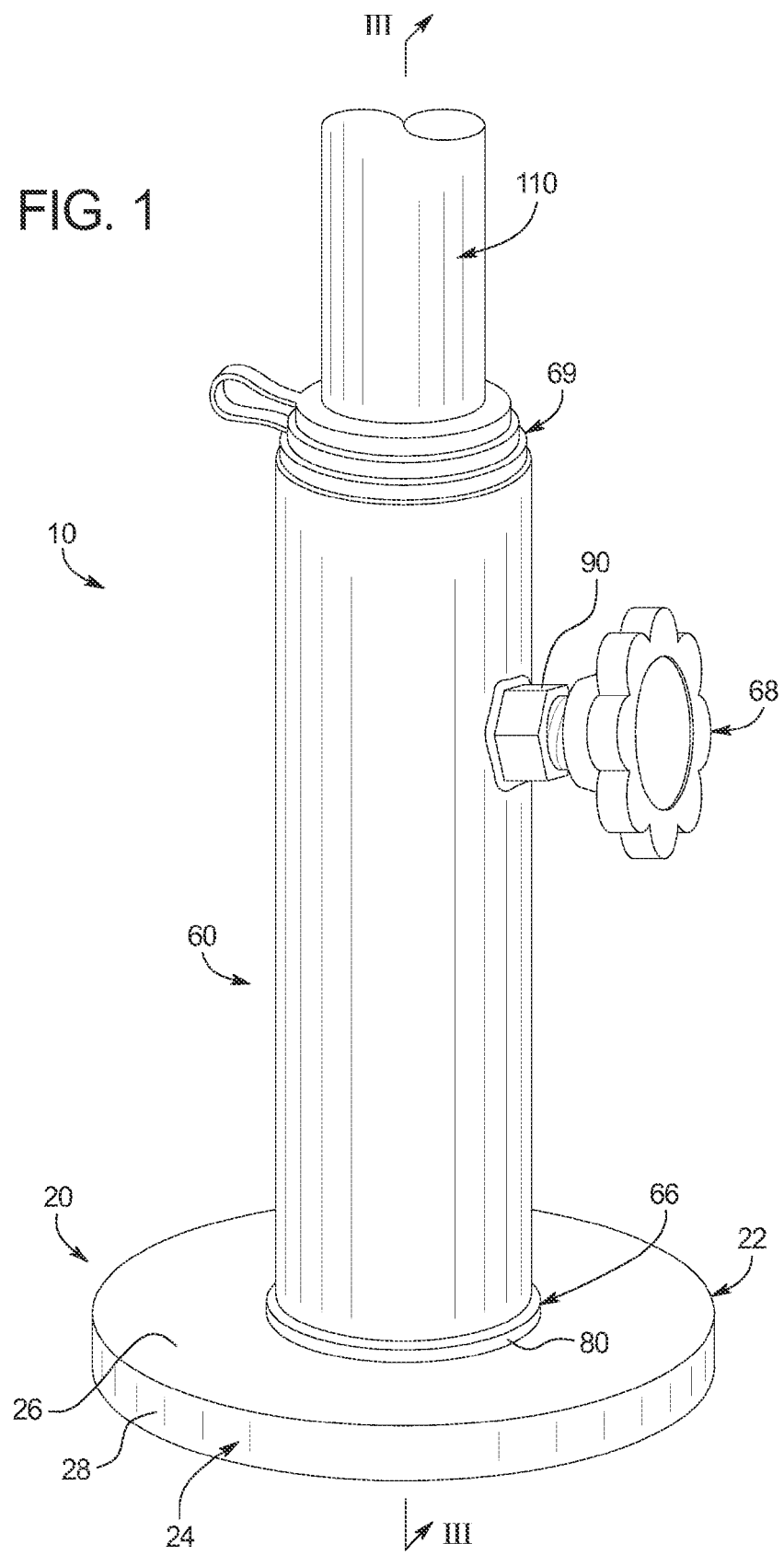
FIG. 1 is a perspective view of one embodiment of the umbrella stand of the present disclosure.
Figure 2:
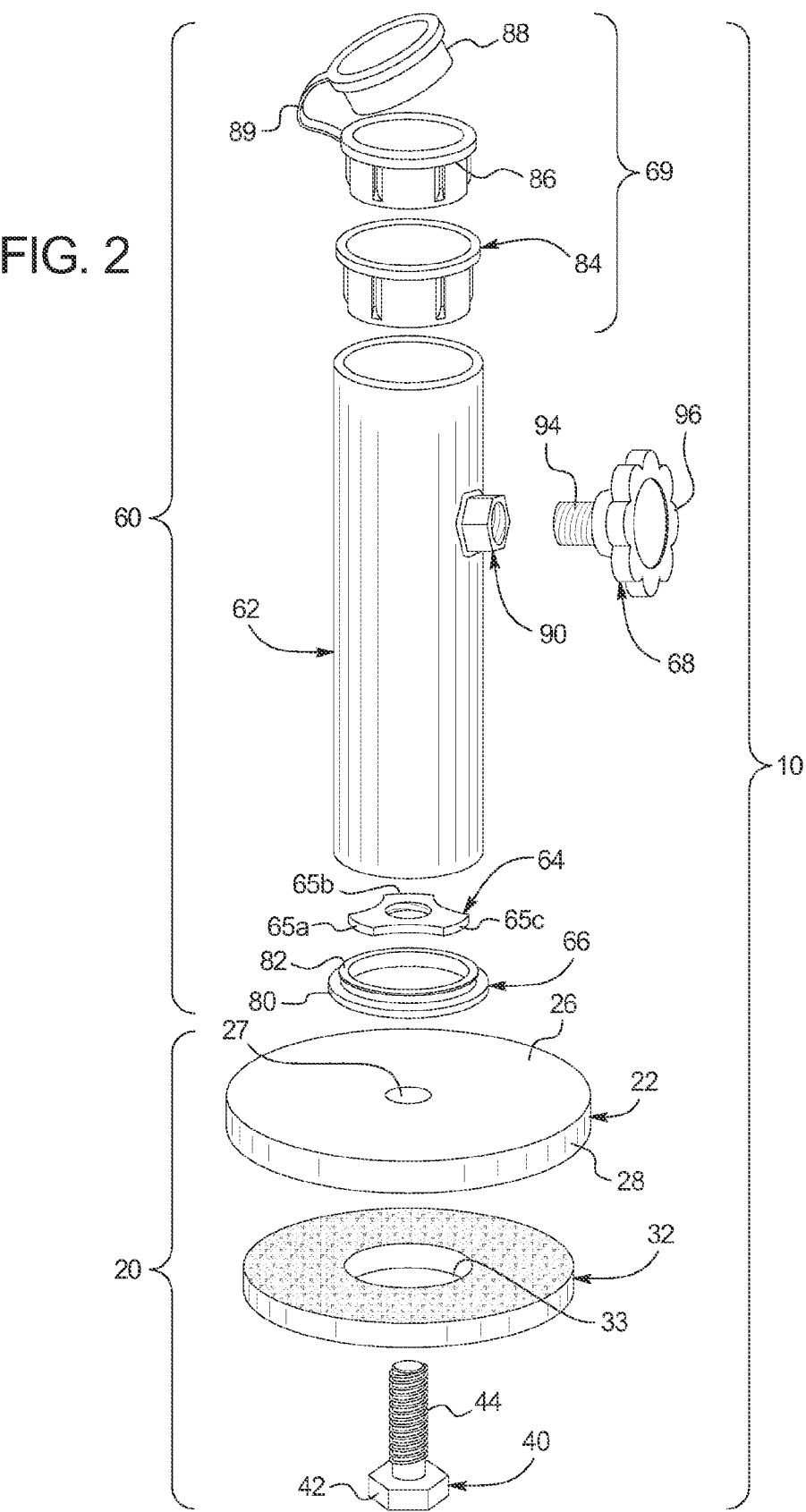
FIG. 2 is an exploded perspective view of the umbrella stand of FIG. 1.
Figure 3:
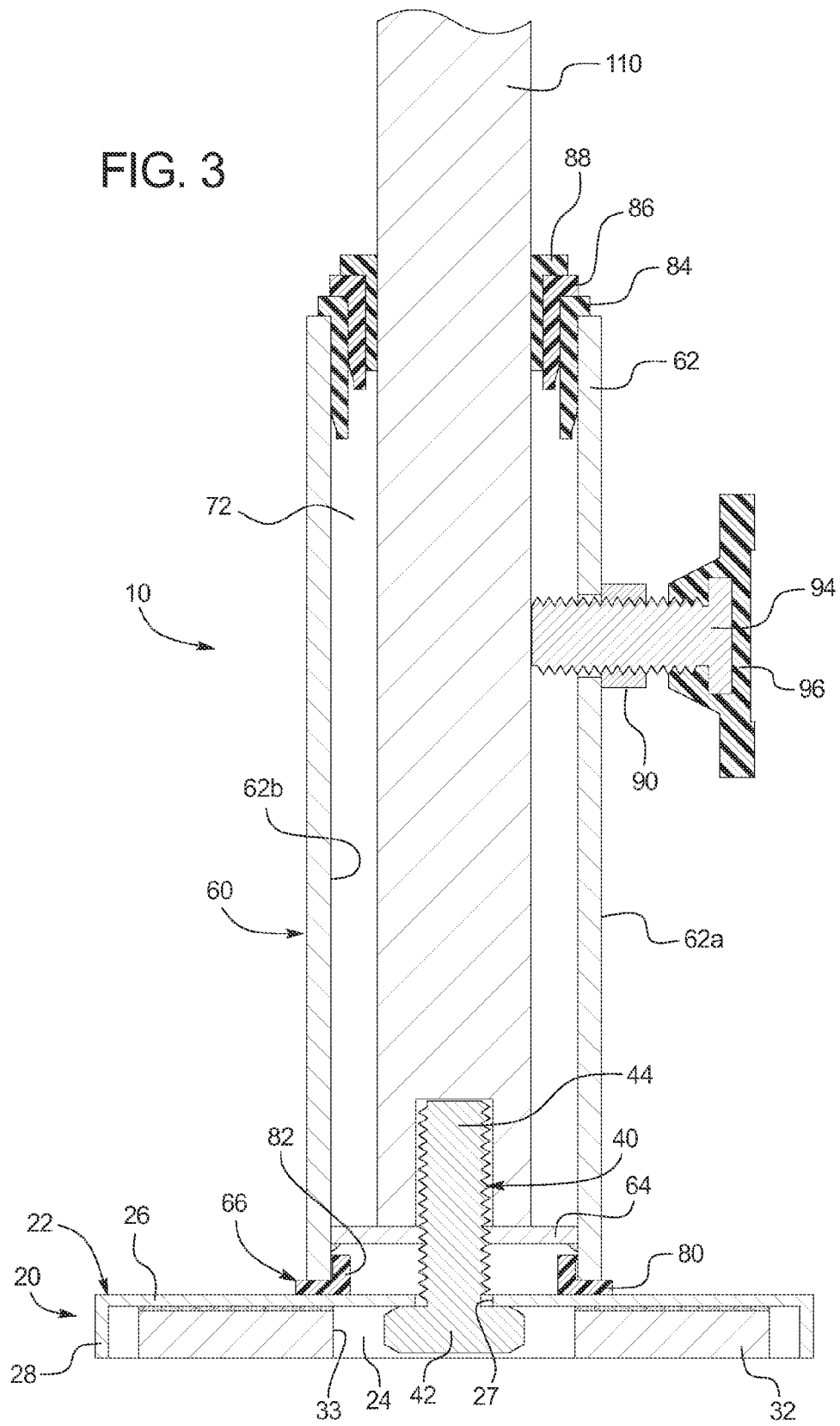
FIG. 3 is a cross-sectional view of the umbrella stand of FIG. 1, taken substantially along line III-III of FIG. 1, and also including a cross-sectional view of the bottom end of an umbrella pole positioned in the umbrella stand.

Turning now to FIGS. 1, 2, and 3, one example embodiment of the compact portable lightweight strong umbrella stand of the present disclosure is illustrated. This example umbrella stand of the present disclosure generally indicated by numeral 10 includes: (a) a magnetic base 20 configured to be securely, but removably, attached to a metal object such as a steel object; and (b) an umbrella pole holder 60 fixed to the magnetic base 20 and configured to securely, but removably, hold an umbrella pole 110 of a relatively heavy umbrella 100 as further discussed below. In this illustrated embodiment, the umbrella pole holder 60 is directly fixed to the magnetic base 20 and not configured to be moved relative to the magnetic base 20 to: (a) provide strength to the entire umbrella stand; (b) limit the size of the entire umbrella stand to make it compact and portable; (c) limit the quantity of parts of the umbrella stand; (d) limit the parts that can break during use in harsh environments; and (e) provide a simple yet strong umbrella stand which can securely hold a relatively heavy umbrella.

More specifically, the illustrated example magnetic base 20 of the present disclosure generally includes a housing 22 which defines a cylindrical magnet holding area 24, a magnet 30 secured to the housing 22 in the magnet holding area 24 defined by the housing 22, and an attachment mechanism such as an attachment bolt 40 which is configured to fix the magnetic base 20 to the umbrella pole holder 60.

The illustrated housing 22 includes a circular first or top wall 26 and a cylindrical second or side wall 28 connected to and extending downwardly from the top wall 26. The bottom surface of the top wall 26 and the inner surface of the side wall 28 generally define the magnet holding area 24. The top wall 26 is formed with or defines a centrally positioned opening 27 sized and configured such that the attachment bolt 40 can engage the bottom surface of the top wall 26 and extend through the opening 27 as shown in FIG. 3. In this illustrated embodiment, the housing has an outer diameter of approximately 4.90 inches (12.40 centimeters) and a height of approximately 0.50 inches (1.30 centimeters).

In this illustrated embodiment, the housing 22 is made from a chrome plated steel and the top and side walls are integrally formed. However, it should be appreciated that in accordance with the present disclosure: (a) the housing can be made from other suitable materials; (b) the top and side walls do not need to be integrally formed; (c) one or more of the top and side walls can be made from multiple parts; (d) the housing can be made without a side wall; and (e) the housing can be formed in other suitable ways, shapes, sizes, and configurations provided that the umbrella stand is still portable, compact, lightweight, and strong enough to hold a heavy umbrella.

The attachment bolt 40 in this illustrated embodiment is a 0.50 inch (1.30 centimeter) bolt. The attachment bolt 40 includes a head 42 and a threaded shaft 44 attached to and extending from the head 40. The head 40 is wide enough to provide sufficient purchase area to securely engage the bottom surface of the wall 26 of the housing 22 as mentioned above. Although not shown, the present disclosure contemplates that one or more suitable washers and/or lock washers may be employed in conjunction with the attachment bolt 40 to fix the magnetic base 20 to the umbrella pole holder 60.

In this illustrated embodiment, the attachment bolt is made from steel and the head and shaft are integrally formed. However, it should be appreciated that in accordance with the present disclosure: (a) the attachment bolt can be made from other suitable materials; (b) the head and shaft do not need to be integrally formed; (c) one or more of the head and shaft can be made from multiple parts; (d) the attachment bolt can be made without a head and with a shaft that otherwise suitably attaches to the housing of the magnetic base; and (e) the attachment bolt can be formed in other suitable ways, shapes, sizes, and configurations provided that it securely fixes the magnetic base to the umbrella pole holder. It should also be appreciated that more than one attachment mechanisms such as more than one attachment bolt may be employed in accordance with the present disclosure to fix the magnetic base to the umbrella pole holder. It should further be appreciated that in alternative embodiments, other suitable attachment mechanisms may be employed in accordance with the present disclosure to fix the magnetic base to the umbrella pole holder.

In the illustrated embodiment, the magnet 32 is positioned in the magnet holding area 24 defined by the housing 22 and secured to the bottom surface of the top wall 26 of the housing 22 by a suitable adhesive as generally shown in FIGS. 2 and 3. The illustrated magnet 32 is in the form of a circular disc and includes an outer centrally positioned opening 33. In this illustrated embodiment, the magnet has an outer diameter of approximately 4.50 inches (11.40 centimeters) and a height of approximately 0.50 inches (1.30 centimeters). In this illustrated embodiment, the magnet has a 200 pound (lb) (90.72 kilogram) pull weight.

In this illustrated embodiment, the magnet 32 is a ceramic magnet. However, it should be appreciated that in accordance with the present disclosure: (a) the magnet can be made from other suitable materials; (b) the magnet can be made with other relatively high pull weights (for the relative area of the magnet); (c) the magnet can be made from multiple parts; and (d) the magnet can be formed in other suitable ways, shapes, sizes, and configurations provided that magnet is strong enough to removably secure the umbrella stand to a metal object while still being small enough to provide a portable, compact, lightweight, and strong enough umbrella stand which is configured to hold a relatively heavy umbrella. In various alternative embodiments, the magnet has a pull weight which ranges from 160 lbs (72.57 kilograms) to 300 lbs (136.08 kilograms). It should be appreciated that multiple magnets can be employed to increase or obtain the desired pull weight, such as for extremely windy areas.

In this illustrated embodiment, a suitable adhesive such as an epoxy is employed to secure the magnet 32 to the bottom surface of the top wall 26 of the housing 22. It should be appreciated that in alternative embodiments of the present disclosure, other suitable adhesives and/or other suitable mechanisms may be employed to secure the magnet in the magnet holding area 24 of the housing 22 and to the housing 22. It should also be appreciated that the magnet is attached to the steel housing which further secures the magnet to the housing. It should further be appreciated that depending on the pull weight of the magnet, the umbrella stand of the present disclosure may need to be pulled off of the metal object by titling it instead of just lifting it from the metal object.

Although not shown, the present disclosure further contemplates that all or part of the bottom portion of the magnet may be protected by a cover such as but not limited to a protective coating or a protective pad (such as a rubber pad)

which prevents the magnet from directly contacting the object on which the umbrella stand 10 is placed to prevent the magnet from scratching that object. It should further be appreciated that the cover may include a complete wrapping of the entire magnet such as a suitable rubber or plastic encasement.

The illustrated umbrella pole holder 60 generally includes a vertically or substantially vertically extending sleeve 62, a nut 64 welded inside the bottom portion of the sleeve 62, an insulator 66 attached to the bottom portion of the sleeve 62, a multi-pole engager 69 attached to the top portion of the sleeve 62, and a pole securer 68 attached to the side of the sleeve 62 and configured to partially extend through the sleeve 62.

The illustrated sleeve 62 has a generally cylindrical tubular body having an outer surface 62*a* and an inner surface 62*b*. The inner surface 62*a* defines a pole receiving channel 72. The sleeve 62 has a top portion that defines an open top end and a bottom portion that defines an open bottom end. In this illustrated embodiment, the sleeve has an outer diameter of approximately 2.00 inches (5.10 centimeters) and a height of approximately 6.00 inches (15.20 centimeters).

In this illustrated example embodiment, the sleeve is made from a butt welded steel tube. In an alternative example embodiment, the sleeve is made in a drawn over mandrel or DOM process and has an outer diameter of approximately 2.00 inches (5.10 centimeters) with an approximately 0.065 inch (0.20 centimeter) wall thickness, and an inner diameter of approximately 1.870 inches (4.80 centimeters). In various embodiments, a section of a steel tube is cut in multiple sections to form multiple sleeves for multiple umbrella stands. It should also be appreciated that in accordance with the present disclosure: (a) the sleeve can be made or formed from other suitable materials; (b) the sleeve can be made from two or more parts; and (c) the sleeve can be formed in other suitable ways, shapes, sizes, and configurations provided that it can work with the other components of the umbrella pole holder to securely hold a pole of a relatively heavy umbrella, and provided that it still provides for a compact, portable, lightweight, yet strong umbrella stand. It should also be appreciated that in alternative embodiments, the outer surface of the bottom portion of the sleeve could be threaded and directly attached to a threaded section of the housing. This alternative embodiment can eliminate the need for the attachment mechanism such as the attachment bolt.

The nut 64 is welded inside the bottom portion of the sleeve as best illustrated in FIG. 3. Specifically, the nut 64 has three outer edges 65*a*, 65*b*, and 65*c* which define an outer circumference which is slightly smaller then the circumference of the channel defined by the inner wall of the sleeve 62, such that the nut 64 can be inserted into the bottom portion of the sleeve 62 for welding to the inner surface of the bottom portion of the sleeve 62. The three outer edges 65*a*, 65*b*, and 65*c* of the nut 64 are each welded to the inner surface of the sleeve 62 as generally shown in FIG. 3 to securely attach the nut 64 in the bottom portion of the sleeve 62. The nut 64 also has a centrally positioned inner threaded surface which is configured to threadably receive the shaft 44 of the attachment bolt 40 as generally shown in FIG. 3, and thus provide for secure attachment of the umbrella pole holder 60 to the magnetic base 20.

In this illustrated example embodiment, the nut 64 is made from a generally cylindrical steel disc. However, it should also be appreciated that in accordance with the present disclosure: (a) the nut can be made from other suitable materials; (b) the nut can be made from multiple parts; (c) the nut can be otherwise suitably secured to the sleeve and secured in different locations relative to the sleeve; and (d) the nut can be formed in other suitable ways, shapes, sizes, and configurations provided that it facilitates secure attachment of the magnetic base to the umbrella pole holder. It should also be appreciated that in alternative embodiments, more than one nut may be employed in accordance with the present disclosure to fix the magnetic base to the umbrella pole holder. It should additionally be appreciated that in alternative embodiments, the nut may be part of the magnetic base and the pole holder may include the bolt and a mounting bracket for the bolt. It should further be appreciated that in alternative embodiments, other suitable mechanisms may be employed in accordance with the present disclosure to fix the magnetic base to the umbrella pole holder.

The illustrated insulator 66 which is inserted partially in the bottom portion of the sleeve 62 generally includes a cylindrical base or outer ring 80 and a cylindrical inner ring 82 connected to and extending upwardly from the base or outer ring 80. Insulator 66 is configured to be positioned in the bottom portion of the sleeve 62 at the open bottom end as generally illustrated in FIG. 3. The base or outer ring 80 is formed such the bottom edge of the sleeve 62 rests on and engages part of the top surface of the base or outer ring 80 as shown in FIGS. 1 and 3. In this illustrated embodiment, the insulator 66 is made from a suitably strong plastic and prevents metal to metal contact between the bottom edge of the sleeve 62 and the top surface of the wall 26 of the housing 22. During assembly, when the attachment bolt 40 is threaded in the nut 64 and tightened, the bottom outer ring 80 is slightly compressed by the bottom edge of the sleeve 62 and the top wall 26 of the housing 22 to assist in forming a secure fixed connection between the sleeve 62 and the housing 22 and thus between the magnetic base 20 and the umbrella pole holder 60. In this illustrated embodiment, the insulator has an outer diameter of approximately 2.1875 inches (5.6 centimeters) and a height of approximately 0.1875 inches (0.50 centimeters) and is sized to fit into the bottom opening of the sleeve.

In this illustrated embodiment, the insulator is molded from a suitably strong molded plastic and the outer and inner rings are integrally formed. However, it should be appreciated that in accordance with the present disclosure: (a) the insulator can be made from other suitable materials; (b) the inner and outer rings do not need to be integrally formed; (c) one or more of the inner and outer rings can be made from multiple parts; (d) the insulator can be made without the inner ring; and (e) the insulator can be formed in other suitable ways, shapes, sizes, and configurations. It should be appreciated that the insulator may be made with a UV inhibited material.

The illustrated multi-pole engager 68 is attached to the top portion of the sleeve 62 and generally includes an outer pole engager 84, an intermediate pole engager 86, and an inner pole engager 88. The multi-pole engager 68 is configured to be positioned in the top portion of the sleeve 62 at the top end as generally illustrated in FIGS. 1 and 3 and configured to engage umbrella poles having different diameters. In particular, the outer pole engager 84 is configured to engage an umbrella pole having a relatively larger diameter pole, the intermediate pole engager 86 is configured to engage an umbrella pole having a somewhat smaller diameter, and the inner pole engager 88 is configured to engage an umbrella pole having an even smaller diameter. FIGS. 1 and 3 shows the entire multi-pole engager 68 partially positioned in and extending from the top portion of the sleeve 62 with the outer pole engager 84, the intermediate pole engager 86, and the inner pole engager 88 all nested together, and with the inner pole engager 88 engaging an umbrella pole 110 having the relatively smaller diameter. If the umbrella stand of the present disclosure is to be used with an umbrella having a somewhat larger diameter pole (not shown), the inner pole engager 88 can be removed and the nested outer pole engager 84 and intermediate pole engager 86 can remain positioned in the top portion of the sleeve 62 such that the intermediate pole engager 86 engages that pole. If the umbrella stand of the present disclosure is to be used with an umbrella having an even larger diameter pole (not shown), the intermediate pole engager 86 and the inner pole engager 88 can be removed and the outer pole engager 84 can be positioned in the top portion of the sleeve 62 such that the outer pole engager 84 engages that pole. This configuration provides flexibility for the umbrella stand of the present disclosure to work with different relatively heavy umbrellas which have different size poles.

In the illustrated embodiment, each of the outer pole engager 84, the intermediate pole engager 86, and the inner pole engager 88 includes a generally cylindrical body and a stopping member attached to the top of the cylindrical body and extending outwardly from the cylindrical body. In this illustrated embodiment, the outer pole engager 84 includes locking ribs attached to and extending from the exterior surface of the cylindrical body of the outer pole engager for facilitating better engagement with the inner surface of the sleeve. In this illustrated embodiment, the intermediate pole engager 86 also includes locking ribs attached to and extending from the exterior surface of the cylindrical body of the intermediate pole engager for facilitating better engagement with the inner surface of the cylindrical body of the outer pole engager 84. In this illustrated embodiment, the inner pole engager 88 does not include locking ribs attached to and extending from the exterior surface of the cylindrical body of the inner pole engager, but in an alternative embodiment could include such locking ribs for facilitating better engagement with the inner surface of the cylindrical body of the intermediate pole engager 86. In this illustrated embodiment, the intermediate pole engager 86 and the inner pole engager 88 are attached by a tether 89 to keep these parts connected. In an alternative embodiment, the intermediate pole engager 86 and the outer pole engager 84 are instead attached by a tether (not shown) to keep these parts connected. In other embodiments, the outer, intermediate, and inner pole engagers are all suitably attached to each other. In other embodiments, the outer, intermediate, and inner pole engagers are not attached to each other.

In this illustrated embodiment, the cylindrical wall of the outer pole engager can be tapered to securely fit into the top of the sleeve. In this illustrated embodiment, the cylindrical wall of the intermediate pole engager can also be tapered. In this illustrated embodiment, the cylindrical wall of the inner pole engager can also be tapered.

In this illustrated embodiment, the outer, intermediate, and inner pole engagers are each molded from a suitably strong molded plastic and the intermediate and inner pole engager are integrally formed (i.e., connected by the tether). However, it should be appreciated that in accordance with the present disclosure: (a) one or more of the pole engagers can be made from other suitable materials; (b) the individual pole engagers do not need to be integrally formed (i.e., do not need to be connected by a tether); (c) one or more of the pole engagers can be made from multiple parts; (d) one or more of the pole engagers can be formed in other suitable ways, shapes, sizes, and configurations; and (e) less or more pole engagers can be employed. It should be appreciated that the pole engagers may be made with a UV inhibited material.

The illustrated pole securer 68 which is attached to the side of the sleeve 62 and extends partially through the tube 62, generally includes a nut 90 welded to the tube 62 and a locking screw 68 including a shaft 94 threadably received in the nut 90 and a grip 96 attached to the outer end of the shaft 94. The shaft 94 is configured to be rotated relative to the nut 90 and to extend through the nut 90 through a hole in the side of the sleeve 62 and to engage the umbrella pole 110 as shown in FIG. 3, to co-act with the pole engager 69 to secure the umbrella pole 110 in the sleeve 62, in the pole holder 60, and thus in the umbrella stand 10.

In this illustrated embodiment, the umbrella 100 includes a solid cylindrical pole 110 which has a bottom portion and a bottom surface, where the bottom portion defines a generally vertically or substantially vertically extending chamber configured to receive an end portion of the bolt as generally illustrated in FIG. 3 which secures the housing to the pole holder. This provides additional engagement between the umbrella pole 110 and the umbrella stand 10 of the present disclosure.

In an alternative embodiment which is not illustrated, the inner wall of the chamber in the umbrella pole is threaded such that the pole can be connected to the bolt.

In a further alternative embodiment which is not illustrated, a threaded nut or other threaded member is positioned and secured in the chamber in the umbrella pole for connection to the bolt.

In a further alternative embodiment which is not illustrated, the umbrella pole does not define a chamber and a threaded nut or other threaded member is positioned or secured to the bottom portion of the umbrella pole for connection to the bolt.

In a further alternative embodiment which is not illustrated, the umbrella pole does not define a chamber and the bottom surface of the pole rests on the top of the shaft of the attachment bolt.

In the illustrated embodiment, the illustrated pole securer is made from a steel nut, a steel shaft and a plastic grip; however, it should be appreciated that in accordance with the present disclosure: (a) the pole securer including any of the nut, shaft and grip can be made from other suitable materials; (b) the pole securer can be positioned at a different location relative to the sleeve; and (c) the pole securer including any of the nut, shaft and grip can be made in other ways, shapes, sizes and configurations. It should also be appreciated that other umbrella pole securing mechanisms may be employed in accordance with the present disclosure.

Figure 4:
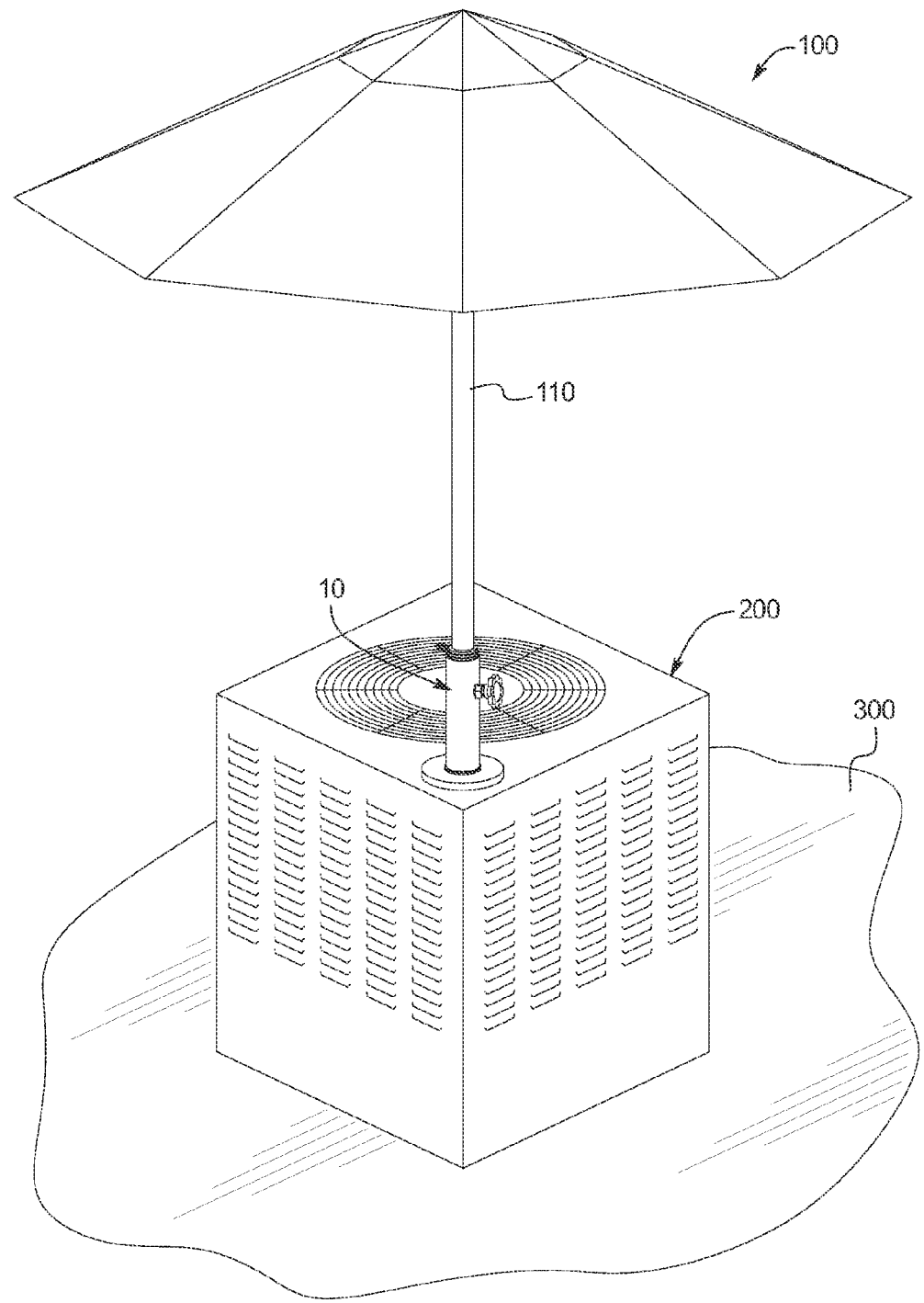
FIG. 4 is a perspective view of the umbrella stand of FIG. 1 positioned on an air conditioning unit and holding an umbrella to provide a shaded area on a roof (shown in fragmentary) of a building (not shown).

It should be appreciated that the umbrella stand of the present disclosure can be employed in a variety of different environments. For example, FIG. 4 illustrates the umbrella stand attached to an air conditioning unit 200 on a roof 300 of a building (not shown), and a relatively heavy umbrella 100 positioned in the umbrella stand 10. It should be appreciated that the umbrella stand 10 maintains the position of the umbrella 110 relative to the air conditioning unit 200 and provides a shaded area for a worker working on the air conditioning unit 200.

Figure 5:
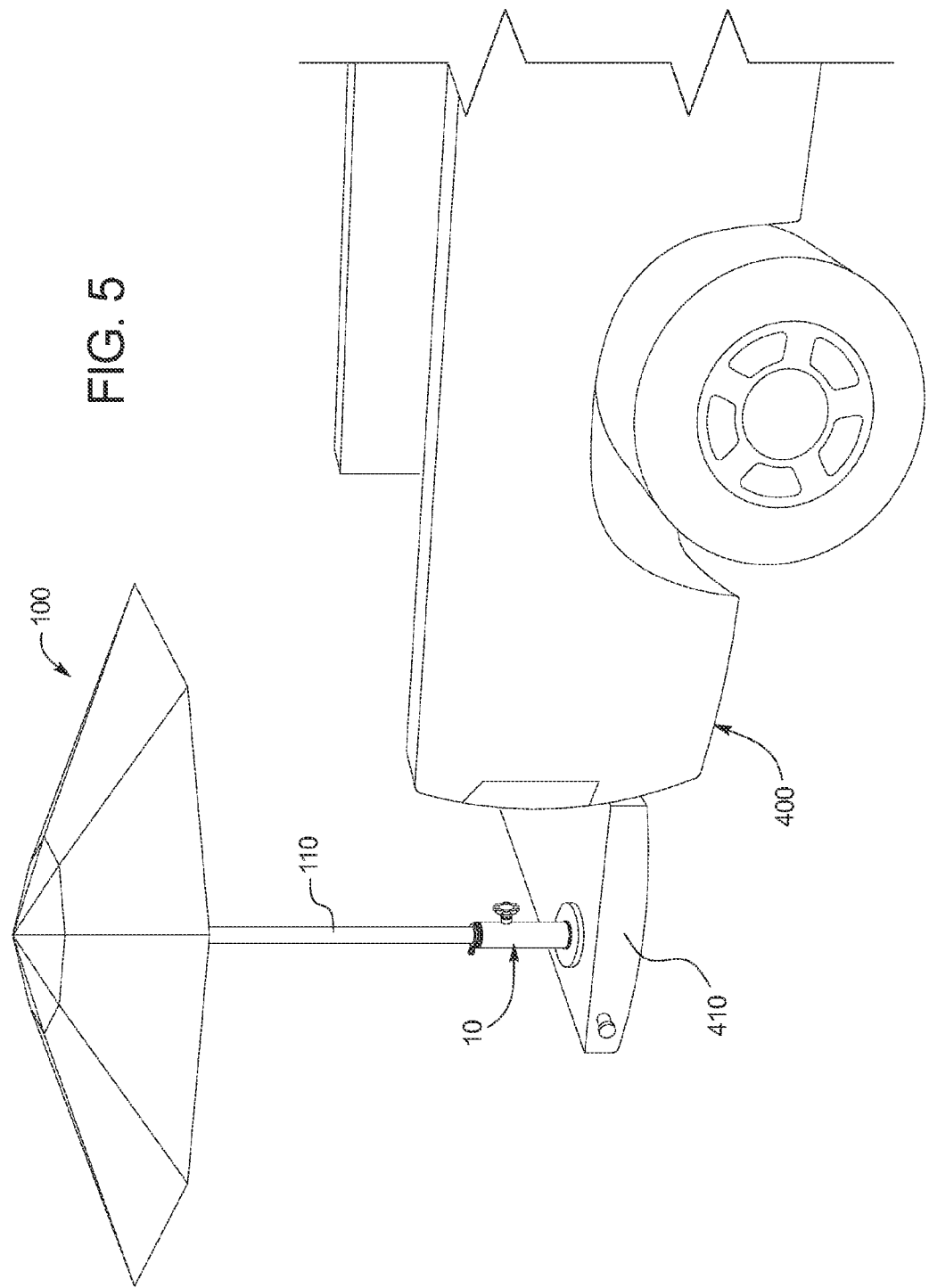
FIG. 5 is a perspective view of the umbrella stand of FIG. 1 positioned on a tail gate of a pick-up truck (shown in fragmentary) and holding an umbrella to provide a shaded area.

Another example of one use of the umbrella stand of the present disclosure is shown in FIG. 5, where the umbrella stand 10 is positioned on and attached to a metal tail gate 410 of a pick-up truck 400. It should be appreciated that the umbrella stand 10 maintains the position of the umbrella 100 relative to the pick-up truck 400 and provides a shaded area for a person such as a worker working under the umbrella 100.

While FIGS. 4 and 5 generally illustrate two potential uses of the compact portable lightweight strong umbrella stand of the present disclosure, it should be appreciated that the compact portable lightweight strong umbrella stand of the present disclosure can be attached to a variety of different objects to provide a shaded area adjacent to or for such objects. Such other objects include but are not limited to: (a) barbeques; (b) movable machinery such as tractors; (c) lawn equipment; (d) coolers; (e) tables; (f) portable stands; and (g) metal ladders. It should also be appreciated that the umbrella stand of the present disclosure can be made in smaller configurations to hold smaller size umbrellas and in certain such instances can be configured to be attached to a movable objects such as fork lifts, material moving carts, and strollers. It should also be appreciated that the umbrella stand of the present disclosure can be made in smaller configurations to hold other objects besides umbrellas such as flag poles.

While the compact portable lightweight strong umbrella stand of the present disclosure is discussed as solving a substantial problem for outdoor workers, it should be appreciated that the compact portable lightweight strong umbrella stand of the present disclosure can employed by any person whether or not working who desires a shaded area. It should also be appreciated that the compact portable lightweight strong umbrella stand of the present disclosure can also be used to provide a protected or covered area from precipitation such as rain.

It should be appreciated from the above example embodiments and explanations that the compact portable lightweight strong umbrella stand is configured to be easily and quickly moved to multiple and assembled at locations, and does not require significant storage space.

It should be appreciated from the above that the magnetic base of the present disclosure has a relatively narrow footprint (as compared to known umbrellas stands described above) to enable the umbrella stand to be compact, portable, and lightweight for commercial use. This relatively narrow footprint in part enables the umbrella stand of the present disclosure to be: (a) attached to a variety of different objects (such as the air conditioner and tailgate shown in FIGS. 4 and 5); (b) carried in trucks of workers without taking up substantial space; (c) used on multiple worksites during a day without being an inconvenience to workers; and (d) easily and readily carried up to roofs or to other job sites.

It should also be appreciated from the above that the pole holder of the present disclosure has a relatively short height (as compared to known umbrellas stands described above) to enable the umbrella stand to be compact, portable, and lightweight for commercial use. This relatively short height in part enables the umbrella stand of the present disclosure to be: (a) attached to a variety of different objects (such as the air conditioner and tailgate shown in FIGS. 4 and 5); (b) carried in trucks of workers without taking up substantial space; (c) used on multiple worksites during a day without being an inconvenience to workers; and (d) easily and readily carried up to roofs or to other job sites.

It should be appreciated that the relatively strong magnetic base of the umbrella stand of the present disclosure in part enables the umbrella pole holder to be relatively short. It should also be appreciated that the combination of the relatively narrow footprint of the magnetic base (as compared to the known umbrella stands described above) and the relatively short height of the umbrella pole (as compared to the known umbrella stands described above) provides substantial advantages over previously known umbrella stands.

It should be appreciated from FIGS. 4 and 5, that the present disclosure contemplates that an umbrella with a relatively shorter pole can be employed with the umbrella stand of the present disclosure. In particular, known patio umbrellas typically have a pole which is approximately 102.00 inches (259.10 centimeters) long, and the present disclosure contemplates that the umbrella stand can be used with umbrellas that have a relatively shorter pole such as a pole that is approximately 42.00 inches (106.70 centimeters) long. This is in part because the umbrella stand will typically be placed on an object which is already off the ground. This also provides for a more compact umbrella. This further reduces the instability of the umbrella relative to the umbrella stand.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A compact portable umbrella stand comprising:
   a magnetic base including:
      (a) a housing having a circular top wall and a cylindrical side wall connected to and extending downwardly from the top wall, the top wall and the side wall defining a magnet holding area, and the top wall defining a centrally positioned opening;
      (b) a magnet secured to the housing by an adhesive in the magnet holding area, said magnet having pull weight of ranging from 160 pounds to 300 pounds;
   an umbrella pole holder including:
      (a) a sleeve having a tubular body having an outer surface and an inner surface, said inner surface defining a pole receiving channel, said sleeve having an open top end and an open bottom end,
      (b) a nut welded to a bottom portion of the inner surface of the tubular body of the sleeve in the pole receiving channel, said nut having a centrally positioned inner threaded surface,
      (c) an insulator including a base positioned at the open bottom end of the sleeve such that a bottom edge of the sleeve rests on and engages part of a top surface of the base,
      (d) a multi-pole engager attached to a top portion of the sleeve, and including an outer pole engager, an intermediate pole engager, and an inner pole engager,
      (e) a pole securer attached to a side of the sleeve and including a shaft that partially extends through the sleeve, and a handle attached to the shaft, and
   said magnetic base including an attachment bolt engaging the top wall of the housing and extending through the centrally defined opening of the housing and through the sleeve and connected to the nut fixing the magnetic base to the umbrella pole holder.

2. The compact portable umbrella stand of claim 1, wherein the magnet has a pull weight of approximately 200 pounds.

3. The compact portable umbrella stand of claim 1, wherein the housing is made from steel, the magnet is a ceramic magnet, the sleeve is made from steel, the insulator is made from plastic, and multi-pole engager is made from plastic.

* * * * *